United States Patent [19]

Ishimitsu et al.

[11] 3,838,425

[45] Sept. 24, 1974

[54] DESIGN FOR REDUCING RADAR CROSS SECTION OF ENGINE INLETS

[75] Inventors: Kichio Ishimitsu, Mercer Island; John D. Kelly, Seattle; Douglas S. Miller, Belle View; Gordon A. Taylor, Seattle, all of Wash.

[73] Assignee: The United States of America as represented by the Secretary of the Navy, Washington, D.C.

[22] Filed: Mar. 28, 1973

[21] Appl. No.: 345,617

[52] U.S. Cl............ 343/18 A, 244/53 B, 343/5 SA, 343/18 E
[51] Int. Cl.... B64d 33/02, H01q 17/00, H04k 3/00
[58] Field of Search.... 343/18 R, 18 A, 18 E, 55 A; 244/53 B

[56] References Cited
UNITED STATES PATENTS

| | | | |
|---|---|---|---|
| 3,168,999 | 2/1965 | Warren et al. | 244/53 B |
| 3,283,324 | 11/1966 | Norman, Jr. | 343/18 R |
| 3,474,988 | 10/1969 | Cox et al. | 244/53 B |
| 3,487,410 | 12/1969 | Barnett et al. | 343/18 R |
| 3,509,568 | 4/1970 | Manning et al. | 343/18 R |
| 3,652,036 | 3/1972 | Sans et al. | 244/53 B |

Primary Examiner—Malcolm F. Hubler
Attorney, Agent, or Firm—R. S. Sciascia; P. Schneider

[57] ABSTRACT

A radar-absorbing shield for aircraft engines of the type having inlet cavities comprising a geometrically shaped piece of radar-absorbing material which is movably attached to the fuselage of the aircraft near the engine inlet. The shield can be moved under and in front of the inlet to shield the cavity from waves from surface radar, or it can be moved so that it is flush with the fuselage when high maneuverability is required. A shield may be placed near each engine on the aircraft.

4 Claims, 2 Drawing Figures

PATENTED SEP 24 1974 3,838,425

DESIGN FOR REDUCING RADAR CROSS SECTION OF ENGINE INLETS

BACKGROUND OF THE INVENTION

This invention relates to the radar cross section (RCS) of aircraft engines and especially to the reduction of the RCS of aircraft engine inlets.

Optimum reflection of "radar energy" occurs when a planar reflective surface is substantially perpendicular to the impinging radiation, this situation being somewhat analogous to the operation of a mirror, and thus producing so-called "specular" reflection. For example, a sphere, which theoretically has only one point perpendicular to the impinging radar energy, would theoretically produce a radar-return by reflecting the radiation at that one point; and, because of the single, small, specular reflection, would be described as having a small RCS.

On the other hand, bodies, such as airplanes, have relatively few planar surfaces, but do have a plurality of multi-curved surfaces. Therefore the impinging radar energy is reflected from a plurality of relatively small curved areas that happen to be perpendicular to the impinging radiation, the plurality of specular reflections producing a medium-sized RCS. Similarly, a ship, with a plurality of planar surfaces, masts, smoke stacks, antennas, and the like, has a larger plurality of widely separated areas that happen to be perpendicular to the impinging radio waves; and since each of these areas reflects some of the impinging radiation, the ship would be described as having a relatively large RCS.

It would appear that a cavity, such as a rocket engine, would have a small RCS, but it turns out that this is not true. On the contrary, the impinging radar energy enters the opening of the cavity, bounces back and forth therein and then emerges from the cavity, some of the emergent energy being directed back toward the radar station. Moreover, the cavity acts in this same manner for practically all radar frequencies.

As a result, a relatively small cavity returns a disproportionately large amount of radar energy back to the radar station and thus is described as having a large RCS, whereas it may actually have a small physical opening. At the radar station, the large return from the cavity indicates the presence of a radar-reflecting body and because of the relatively high strength of the return, the direction and range of the cavity-carrying body can be quickly and accurately determined.

Practically all present-day airplanes use a plurality of jet engines, each engine having an intake opening and an exhaust opening, so that each jet engine acts as a radar-reflecting cavity that has a front and a rear opening which coact to produce a large RCS. Under certain conditions, this is desirable, as for example when an airport control-tower is to monitor incoming and departing aircraft. However, under other conditions, it may be desired that the aircraft have minimal RCS, for example, when a control-tower does not want its radar display cluttered by radar returns from departing aircraft, or when the aircraft wishes to remain undetected. Thus, for certain conditions, the apparant RCS should be minimal in order to reduce the amount of "threat" radar radiation that is reflected to radar-utilizing facilities, the term "threat" radar being construed to include externally produced radar radiations from friendly monitoring stations.

Attempts have been made to reduce the RCS of engines by using radar absorbing materials and by using metallic screening whose spacing between strands is of the same order of magnitude as the wavelength of impinging radar energy. Radar absorbing materials are limited in their capability to withstand the high temperatures of jet engines and tend to be quite heavy, thus loading down the aircraft with extra weight. Screening tends to interfere with the operation of the intake and exhaust systems.

SUMMARY OF THE INVENTION

The present invention comprises a shield of radar-absorbing material placed on the aircraft so that it can be moved under and in front of the inlet cavity of an engine to lie in the path of waves from surface radars. The shield is also movable to place it flush with the fuselage when high maneuverability is desired.

OBJECTS OF THE INVENTION

An object of this invention is to decrease the radar cross section of cavities in aircraft in an improved and novel manner.

Another object is to decrease the RCS of engine inlets on aircraft in such manner that interference with inlet performance engine requirements and aircarft performance is reduced.

Other objects, advantages and novel features of the present invention will become apparent from the following detailed description of the invention when considered in conjunction with the accompanying drawing.

DETAILED DESCRIPTION OF THE PREFERRED EMBODIMENT

Figure 1:
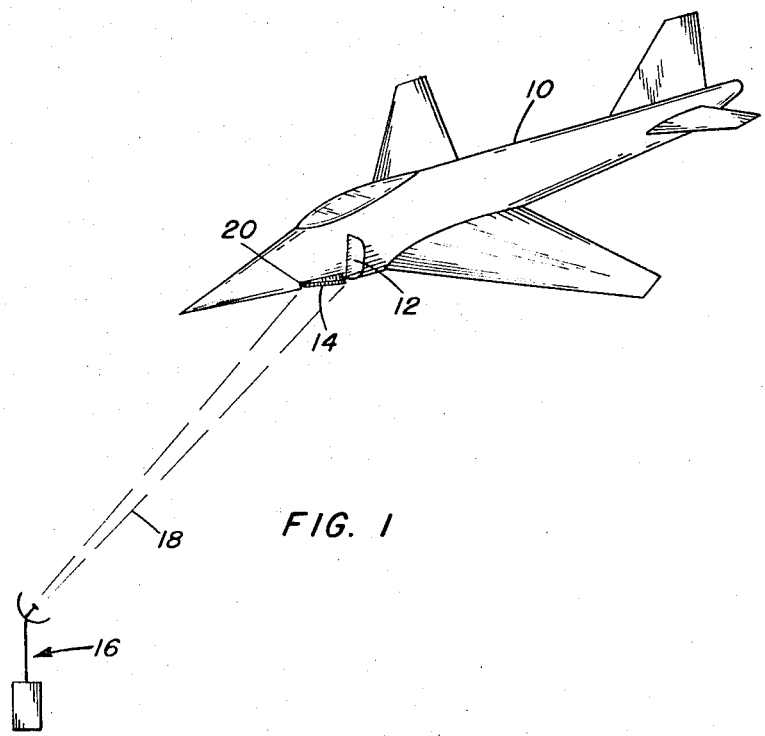
FIG. 1 is an illustration of an embodiment of the invention shielding an engine inlet cavity from surface radar.
Figure 2:
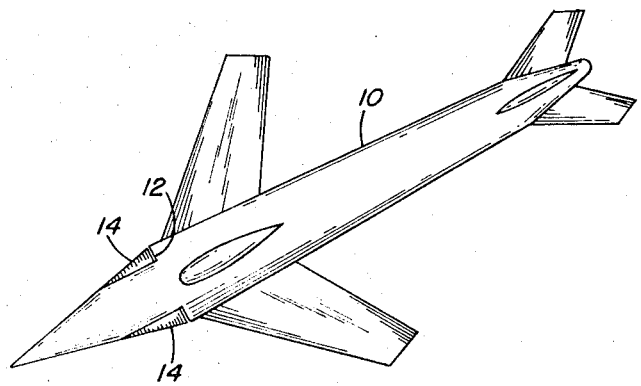
FIG. 2 is a top view of the aircraft and shields.

FIG. 1 shows a jet aircraft 10 having a pair of jet engines (only one of which is visible here) located close to the fuselage. Jet engines scoop air through an inlet cavity 12 which is shown. A shield 14, which may be of triangular shape, for example, extends from a point of contact 20 beneath the front of the aircraft slantingly outward toward the rear so that its rear end extends to the outermost part of the inlet cavity. The shield 14 then presents a triangular shape when viewed from above, as in FIG. 2.

It can be seen that in this extended position the waves 18 from a surface radar 16 are blocked by the shield 14 from entering the inlet cavity 12, if the shield 14 is constructed properly. The shield 14 may be made of a solid piece of radar-absorbing material some of which are described in U.S. Pat. No. 3,349,397, Flexible Radiation Attenuator, for example. The shield may be made of a stiff material and coated with radar-absorbing material if the latter is too flexible to be used by itself.

The shield 14 in the figures may be used in the extended position when the aircraft is flying at relatively constant angles of attack as, for example, when cruising. The shield may be retracted to be flush with the fuselage if aggressive enemy action requires the aircraft to maneuver through large angles of attack where the shield might provide unacceptable engine distortion and reduced inlet performance.

Means for moving the shield is, of course, conventional.

Obviously, many modifications and variations of the present invention are possible in light of the above teachings. It is therefore to be understood that, within the scope of the appended claims, the invention may be practiced otherwise than as specifically described.

What is claimed is:

1. A device for reducing the radar cross section of an aircraft engine inlet cavity comprising:

a shield movably attached to the fuselage of an aircraft, said sheild being extendable from the fuselage so that it extends forward from the inlet cavity and below the cavity in the path of waves coming from a surface-positioned radar, said shield also being retractable to a position which is flush with the fuselage, said shield acting to prevent radar waves from entering said cavity.

2. A device as in claim 1, wherein said shield is triangularly shaped.

3. A device as in claim 1, wherein said shield is formed from a radar-absorbing material.

4. A device as in claim 1, wherein said shield is made of a rigid material coated with a radar-absorbing material.

* * * * *